Feb. 6, 1951     E. I. STEARNS, JR     2,540,798
COLOR PREDICTOR FOR PIGMENTS Filed May 7, 1946     9 Sheets-Sheet 1

INVENTOR
EDWIN I. STEARNS, JR.,
BY
Robert Ames Norton
ATTORNEY

Feb. 6, 1951  E. I. STEARNS, JR  2,540,798
COLOR PREDICTOR FOR PIGMENTS

Filed May 7, 1946  9 Sheets-Sheet 7

INVENTOR
EDWIN I. STEARNS, JR.,
BY
ATTORNEY

Fig. 14.

Patented Feb. 6, 1951

2,540,798

UNITED STATES PATENT OFFICE 2,540,798

COLOR PREDICTOR FOR PIGMENTS

Edwin I. Stearns, Jr., Plainfield, N. J., assignor to American Cyanamid Company, New York, N. Y., a corporation of Maine Application May 7, 1946, Serial No. 667,977

8 Claims. (Cl. 235—61)

This invention relates to a method and apparatus for obtaining in physical form quantities proportional to the reflectance of a plurality of pigments with or without substrates.

The problem of predicting integrated tristimulus values of a plurality of dyes or a plurality of dyes and substrates has long been a serious one in the dye industry. Its solution normally required extensive and time consuming mathematical computation from spectrophotometric data, and in most cases the computations were not made and color shades were matched empirically by a cut and try method.

The problem of predicting tristimulus values of dyestuffs and substrates has been solved by two general methods. One uses a continuous integration system and is described and claimed in the copending application of Robert H. Park, Serial No. 667,975 filed May 7, 1946, now abandoned. As the details of this method and apparatus do not form a part of the present invention the procedure will be described in general terms. Essentially, additive physical quantities are produced corresponding to the additive function $$CK = \frac{(1-b)^2}{b}$$

where $b$ is body reflectance and $C$ is dye concentration. These additive physical quantities, which may be voltages, capacities, resistances, or any other physical quantities capable of instantaneous or rapid automatic summation, are summed and then transformed into a corresponding physical quantity proportional to total reflectance $R$ of the dyes and/or substrate. This quantity is then multiplied by the tristimulus coefficients at each wave length in the spectrum and the three values integrated through the spectrum by any suitable integrating device, such as for example, mechanical integrators of the disc and planimeter wheel type. The final result of the process or the final indication of the machine is a series of values representing the integrated tristimulus values of the dyes and substrate at the chosen dye concentrations. The multiplication by tristimulus coefficients may be effected for various sets of tristimulus coefficients, for example, various sets of the customary tristimulus coefficients for particular illuminants, such as daylight, tungsten light, etc., or special tristimulus coefficients may be used which involve minimum overlapping, although they will often involve negative values, which present no problem in many well known integrators such as those of the disc and planimeter wheel type.

The second method of obtaining integrated tristimulus values of the plurality of dyes and/or substrates involves the choice of a suitable number of wave lengths in the spectrum, for example, ten or eleven. Additive physical quantities corresponding to the values of $K$ are produced for each wave length, instantaneously summed, transformed into physical quantities corresponding to reflection, and these quantities then multiplied by the tristimulus coefficients and summed. The method and apparatus for this type of color prediction are described and claimed in my copending application, Serial No. 626,310, filed November 2, 1945.

The two methods and machines described above may be considered in a broad sense as various modifications of a single method of attack on the problem. They are, however, quite different in practical use. The continuous integration method produces results of the highest accuracy, particularly when the enormous range for $K$'s of various dyestuffs is broken up into a series of ranges and special electrical networks are used in certain ranges. However, this method and apparatus does require some time, which may be of the order of about a minute or two for the continuous integration, and does not give substantially instantaneous results. The continuous integration methods described in the Park application, therefore, do not lend themselves readily to automatic shade matching as the intervention of the operator is usually necessary to choose new sets of concentrations based on a comparison of the integrated tristimulus values obtained as compared to the same integrated tristimulus values of the shade to be matched. The selected and weighted ordinate method described and claimed in my copending application above referred to gives results the accuracy of which is not as high over as great ranges of $K$. However, the production of integrated tristimulus values is substantially instantaneous and this permitted the development of this method of color prediction into a color matching procedure and apparatus in which the concentration of the dyestuffs is varied in accordance with the differentials between integrated tristimulus values of the dye mixture and shade to be matched until a match is obtained. This further development forms a part of my copending application above referred to, but as it is not as applicable to the problem of mixed pigment color prediction which forms the subject matter of the present invention, this portion of the method is of less interest in connection with the present invention.

Color prediction by summing physical quantities proportional to concentration times K, transforming into physical quantities proportional to R times tristimulus coefficients, and integrating, is only applicable to colors in which the particle size is so small with respect to the wave length of light that surface reflectance phenomena from individual particles, the so-called light scattering effect is negligible, as far as dye particles are concerned and the scattering effect of the substrate, such as cloth, is constant. In other words, the process and apparatus of the Park and Stearns applications above referred to are practically limited to dyes or such pigments as occur in a comparable state of dispersion. With ordinary pigments the particle size is such that the effect of light scattering is no longer negligible and, on the contrary, it constitutes an important factor in the overall reflectance at various wave lengths in the spectrum. Nevertheless, the prediction of integrated tristimulus values for a mixture of pigments is in many ways just as important a problem as the corresponding prediction in the case of dyestuffs. It is to the solution of this problem that the present invention is directed.

I have found that there are two characteristics of pigment reflection, each of which is independently additive. One factor is the specific light absorption which is substantially the same thing as the function K for a dyestuff. The other is an analogous function for the light scattering effect of pigment particles which, while it is not the same as K, and changes in a manner quite different from K, is nevertheless additive. Both the additive function K and the additive light scattering function which will be referred to in this specification as S, remain additive when multiplied by concentration. I have found that the total light reflectance may be considered as proportional not to the sum of the CK's or CS's but to the ratio CK to CS. The method of the present invention utilizes this property of pigments in order to produce a quantity proportional to the overall reflectance of a mixture of pigments and/or substrates, which quantity can, of course, be multiplied by tristimulus coefficients and integrated either by continuous methods and apparatus such as described in the Park application above referred to, or by the chosen ordinate methods of integration described in my copending application above referred to. In other words, once a quantity proportional to total reflectance R for the mixture of pigments has been produced, the production of integrated tristimulus values therefrom proceeds in precisely the same manner as described in the Park and Stearns applications because, of course, the integrating portion of the apparatus or the integrating steps of the method are not concerned with the past history of the quantity proportional to R and will operate with such a quantity regardless of the method and apparatus by which it is produced. Therefore, the present invention is new only in this portion of the total process of producing integrated tristimulus values.

The production of additive physical quantities proportional to the sum of the CK's for the different pigments and substrates and the similar quantity proportional to the CS's is effected by the same general means as described in the Park and Stearns applications for the sum of CK's for dyestuffs. The problem is precisely the same but the transformations, machine elements such as cams, and the like, of course, must be chosen to correspond to the additive function of the pigment rather than the additive function of the dye. A number of typical methods will be illustrated in the specific description of the various modifications of the present invention, and of course the other methods such as those described in the Park and Stearns applications may also be used.

Since it is necessary to obtain a ratio between the sums of CK's and CS's the relative advantages of different physical additive quantities changes somewhat. In the problem with dyestuffs to which the Stearns and Park applications refer, the use of voltages as additive physical quantities presents such enormous advantages, particularly for continuous integration processes requiring maximum accuracy, that they are greatly preferred over any other physical additive quantities. In the present invention, however, which requires obtaining a ratio between summed quantities, voltages are much less advantageous because methods of obtaining ratios of voltages are neither as simple or as satisfactory as is the case with other physical quantities. Capacities may be used as it is a simple matter to obtain quantities proportional to a ratio of capacities in an ordinary Wheatstone's bridge circuit. However, the extreme delicacy of devices involving capacities as additive quantities still render this modification less desirable for practical operation, although it is included and will be described. Resistances present by far the greatest advantages, particularly from the standpoint of continuous integration processes. The ratio of two resistances can be obtained in a simple Wheatstone's bridge circuit and resistances are rugged and reliable elements. The advantages of resistances might lead one to conclude that it would be desirable to use resistances as the only physical quantities in the first step of transformation. This, however, is not true for all cases because the problem of high accuracy with enormous ranges of K is difficult to solve with pure resistances. For maximum accuracy, which is of importance when the quantities are to be used for continuous integration, it is possible to obtain all the advantages of voltages and resistances by using voltage circuits to perform the additions of CK's, matching the resulting voltage with a motor driven matching device which is connected to produce a proportional resistance, and then matching the two resistances produced in a Wheatstone bridge circuit. This modification retains the extreme accuracy possible with voltages for enormous ranges of K and the simple ratio matching properties of resistances. However, the advantages of this combination are obtained at the expense of complexity. Two or three times as many motor drive matching devices are necessary and this increases the cost of machines to a considerable, though by no means prohibitive, extent.

When extreme accuracy over enormous ranges of K is not essential it is possible to operate with voltages alone. A voltage is obtained corresponding to the sum of CK's and another corresponding to the sum of the CS's in the usual manner, as described in the Park and Stearns applications. These two voltages are then fed into logarithmic vacuum tube amplifiers, the output voltages of which are connected in opposition. An output voltage is then obtained which is proportional to the logarithm of the ratio of the sum of the CK's over the sum of CS's. This voltage may then be used with a vacuum tube of suitable characteristics to produce an output corresponding to R.

It is much easier, of course, to transform a quantity proportional to the log of K or log S into R because even with enormous ranges of K or S the ranges of their logarithms is reasonably small. Such all voltage systems are particularly advantageous with the chosen ordinate method of production described in my copending application above referred to, as the accuracy which is obtainable with combination of logarithmic amplifiers and tubes of chosen characteristics is easily maintained in the same order of magnitude as the accuracy for a reasonable number of chosen ordinates. Where extreme accuracy over enormous ranges of K and S are required in continuous integration processes an all voltage system involving logarithmic amplification is less desirable and presents a more serious problem in electronic circuit design.

If the pigments are used in a vehicle, the S curves are materially changed if the vehicle has a refractive index differing markedly from the standard vehicle for which the process and apparatus are primarily designed. While the vehicle changes S curves, it does not change the K curves, except in the case of colored vehicles which, of course, add their own K.

For practical operation of the process and apparatus, K and S curves are calculated for one particular vehicle, since the common vehicles in use have refractive indices sufficiently close to each other so that the difference is negligible. The question of color of the vehicle is of little or no importance in paints, because the pigmentation is so heavy that the K of the vehicle is negligible. Highly colored plastics, however, present a different problem, and in such cases, particularly with phenol-aldehyde condensation products, it is necessary to include the K of the plastic.

The invention will be described in greater detail in conjunction with a number of typical modifications and in conjunction with the drawings, in which.

Figs. 1 to 8 show a modification using eleven ordinates in the spectrum for the K and S curves of three pigments and a substrate. As most of the elements are duplicated for each color and substrate, they will bear the same reference character with the subscript, A, B or C for the particular pigment and D for the substrate. The letter K will be applied to the parts relating to the K curves of the pigments and the substrate and the letter S for the corresponding S curves. In a similar manner, elements associated with each tristimulus curve will carry the letter X, Y and Z of the corresponding tristimulus.

Figure 1:
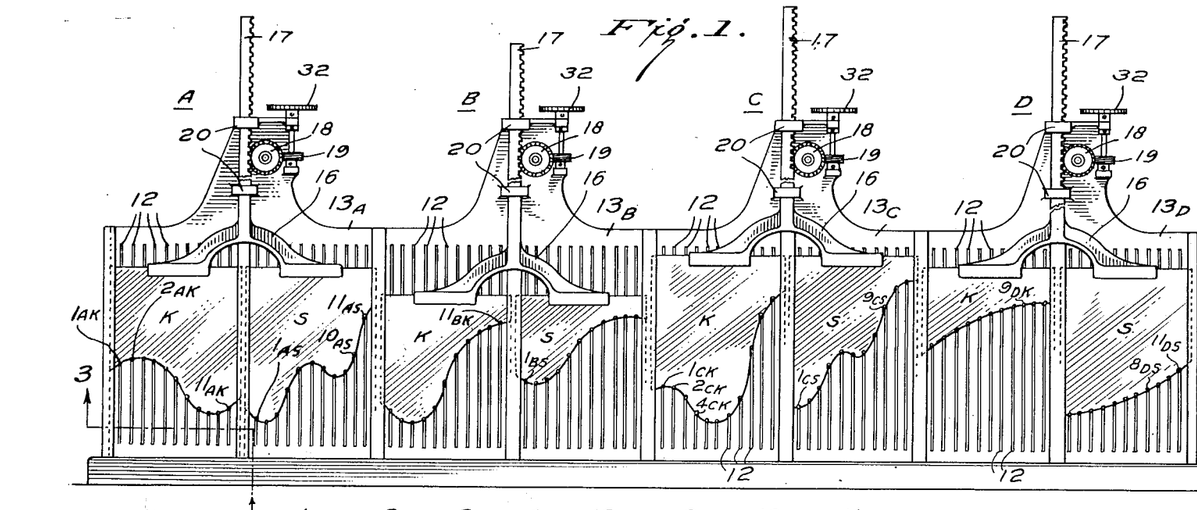
Fig. 1 is an elevation of four double template frames for three pigments and a substrate.
Figure 2:
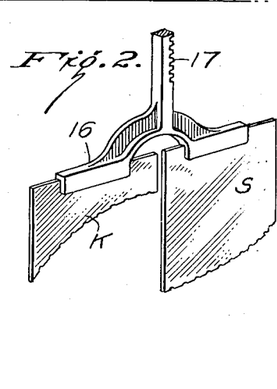
Fig. 2 is a detailed perspective of a double template.

Fig. 1 shows four double template guide frames 13, each provided with two sets of eleven slots 12 in which the pins 1 to 11 can move. Three of the frames are designated A, B and C for three pigments and the fourth D for a white substrate. Each frame accommodates a double template, the profile of one template corresponding to the logarithm of the additive function K, of the pigment or substrate, and the profile of the other to the logarithm of the corresponding additive function S.

The pins are spring pressed against the profiles of the templates, as will be described below, and forces them against the clamps 16 which are attached to racks 17 (Fig. 2) moving through bearings 20 on each template frame. Each rack meshes with a pinion 18 which is driven through a worm 19, actuated by a hand dial 32. Vertical motion of the templates results in positions of the pins $1_{AK}$ to $11_{AK}$, $1_{AS}$ to $11_{AS}$, $1_{BK}$ to $11_{BK}$, $1_{BS}$ to $11_{BS}$ etc. In other words, each pin is positioned in accordance with the logarithm of the product of concentration and K or S for the particular pigment or substrate at the wave length in the spectrum corresponding to the pin. The vertical position of each pair of templates is determined by the setting of the dials 32. The latter carry logarithmic scales and as vertical position of the templates is proportional to the logarithm of concentration of the pigments and the substrate, the scales read directly in concentrations.

Figure 3:
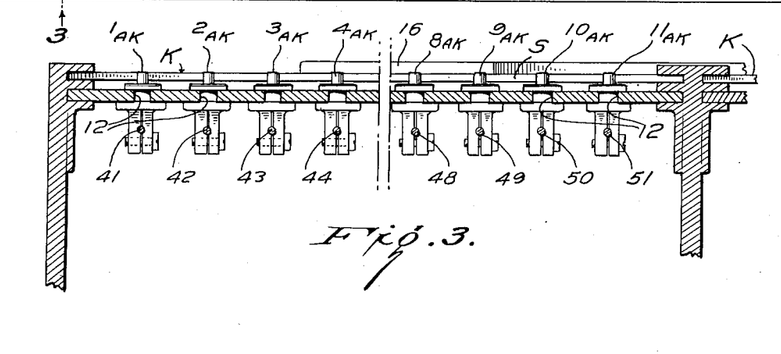
Fig. 3 is a horizontal section, partly broken, along the line 3—3 of Fig. 1.
Figures 5, 6, 7, 8:
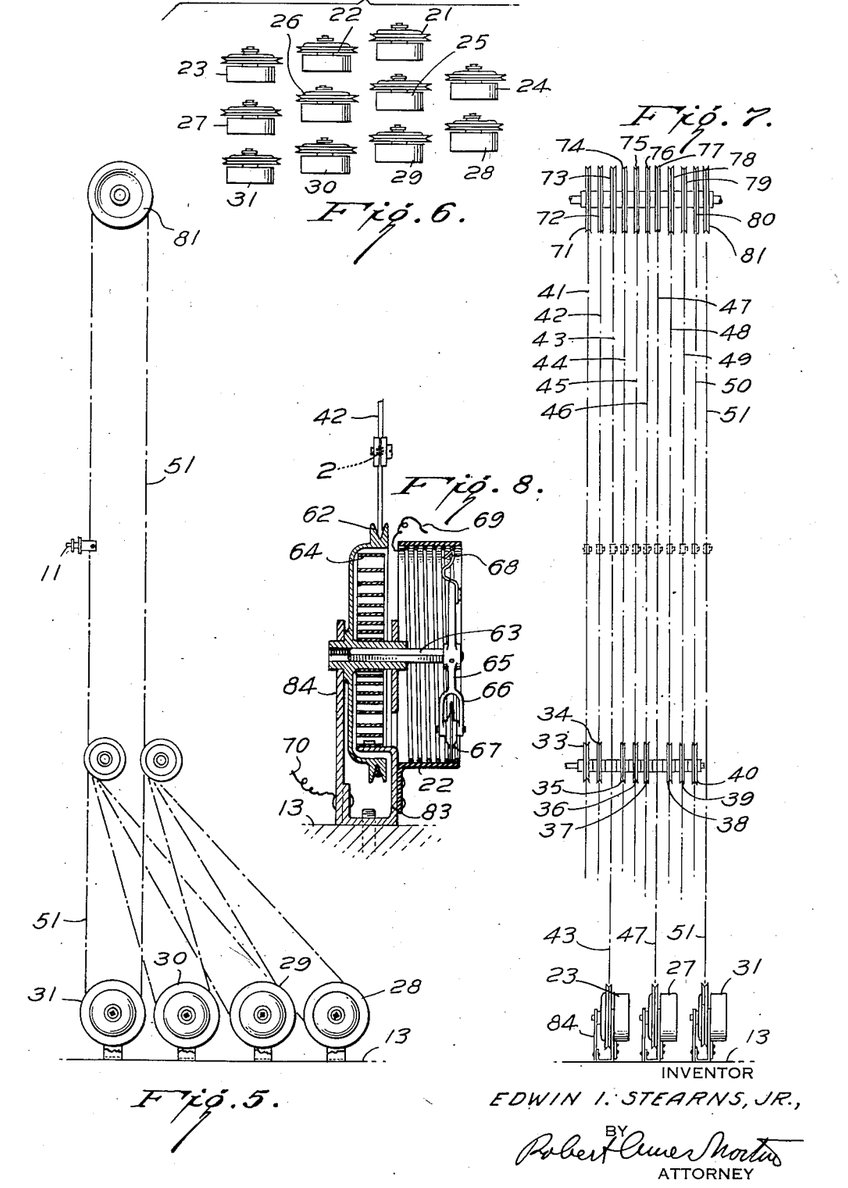
Fig. 5 is a side view of the rheostat drives of one of the templates.
Fig. 6 is a bottom view corresponding to Fig. 5.
Fig. 7 is a top view of the rheostat drives shown in Fig. 5.
Fig. 8 is a detailed enlarged vertical section through one of the rheostats.

The pins 1 to 11 in each frame are clamped to endless cables 41 to 51 (Figs. 3 and 7). These cables at one end run over a series of idler pulleys 71 to 81 (Fig. 7), and then around the pulleys of corresponding helical rheostats 21 to 31 (Figs. 5 to 7). Three of the cables 43, 47 and 51 are straight. The other cables are deflected down by pulleys 33 to 40 (Figs. 5 and 7) in order to permit a staggered mounting of the rheostats 21 to 31.

The rheostats are of a logarithmic type, the drive being illustrated in Fig. 8 for the rheostat numbered 22. The pulley is shown at 62 and turns a shaft 63 journaled in an arm 84 which is clamped to the rheostat supporting bracket 83, the latter being in turn fastened to the main framework of the template frame. Rotation of the pulley 62 is opposed by the coiled spring 64 which tends to turn the pulley so that when there is no template in the frame, the pin 2 is at the top of its slot. To the shaft 63 there is clamped an arm 65 bearing at one end a fork 66 with a sharp wheel 67 running between the coils of the rheostat 22. The other end carries a moving contact 68. Wires 69 and 70 connect to the two ends of the rheostat. As shown, the rheostat makes five full revolutions to cover the whole of its resistance. The resistance is of coiled wire type and is, of course, non-uniform, as in all logarithmic rheostats, the scale of Fig. 8 being too small to show this non-linearity.

Figure 4:
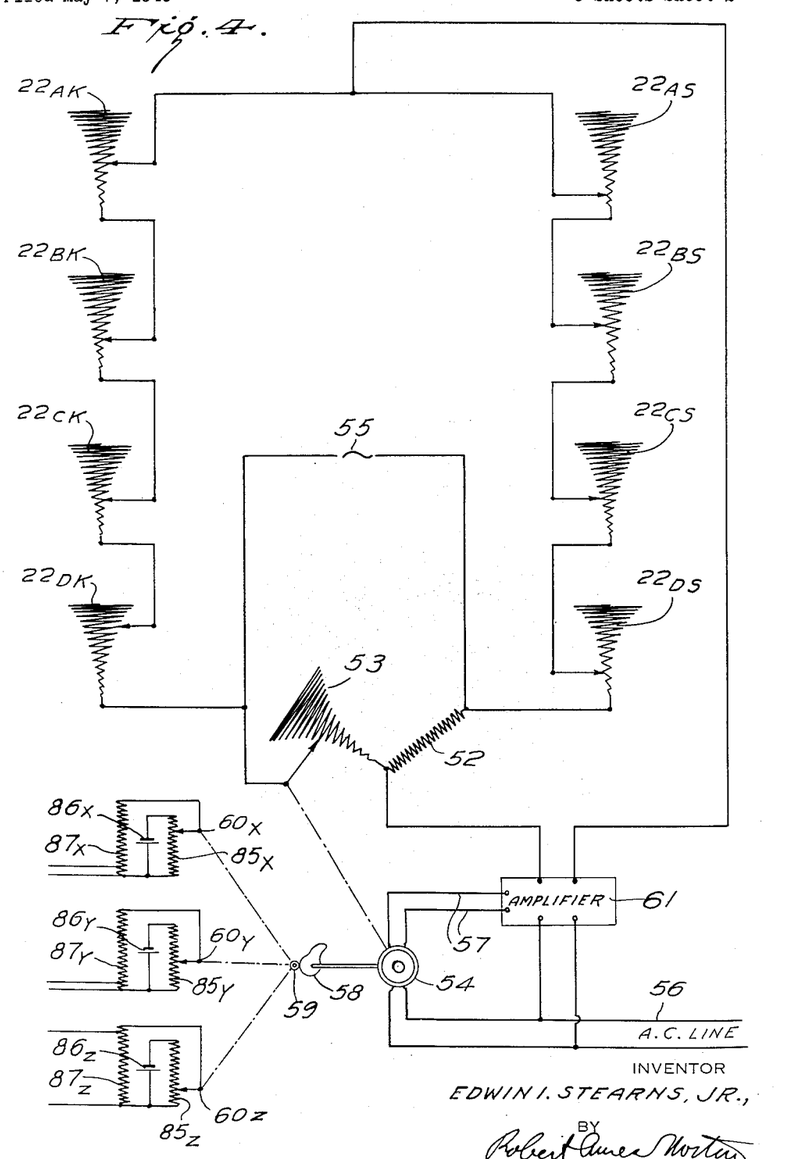
Fig. 4 is a wiring diagram for one pin position for one of the pigments of Fig. 1.

Fig. 4 is the wiring diagram for pins 2AK and 2AS. Rheostats 22AK—22DK and 22AS—22SD are shown diagrammatically as logarithmic rheostats. The rheostats are connected in series to add the resistances and the sums of the resistances of the four K rheostats and the four S rheostats form two arms of a Wheatstone bridge. The other two arms of the bridge are formed by a fixed unit resistance 52 and a matching variable logarithmic rheostat 53 driven by the matching motor 54. A suitable source of potential 55, either D. C. or A. C. of a frequency such that the rheostats behave as substantially non-inductive, is across one pair of arms of the bridge, the other two corners of the bridge leading to an electronic amplifier 61 of conventional design fed from the common A. C. line 56. The output of the amplifier, passing through the wires 57, energizes the motor 54 and causes it to move the arm of the rheostat 53 in a direction to restore the bridge to balance. At balance, the input to the amplifier is zero and the motor ceases to turn.

The value of the resistance of the rheostat 53 is proportional to the ratio of the sum of the K rheostats and the S rheostats for the particular pin. Since the rheostat 53 is logarithmic, the rotation of the motor is proportional to the logarithm of the ratio of the K and S resistances. The motor drives a cam 58, provided with a cam follower 59 which moves the arms 60x—60z of three equal potentiometers 85x—85z across batteries 86x—86z. Tapped resistors 87x—87z are in parallel with the potentiometer resistances. These resistances are tapped in accordance with the tristimulus coefficients for the particular wave length, and the resistance values of the potentiometers and tapped resistances are so chosen that the movement of the potentiometer does not materially affect the impedance of the tapped resistor. This necessitates using a potentiometer of much lower resistance than the tapped resistors, the resistance of the latter being, for example, 1,000 to 10,000 times as great.

The operation of the process and apparatus modification described in Figs. 1 to 8 produces three voltages corresponding to reflectance multiplied by tristimulus coefficient for each pigment or substrate, for each pin position. The voltages for each tristimulus function for each pigment are connected in series to produce three voltages for each pigment and substrate, each voltage being proportional to the sum of reflectance times tristimulus coefficient. In other words, these voltages are approximately proportional to the integrated tristimulus values of the pigments and substrate, the degree of accuracy depending on the number of pins and the nature of the pigments and substrates. The values of these integrated tristimulus voltages are measured by conventional indicating or recording instruments (not shown).

Figure 9:
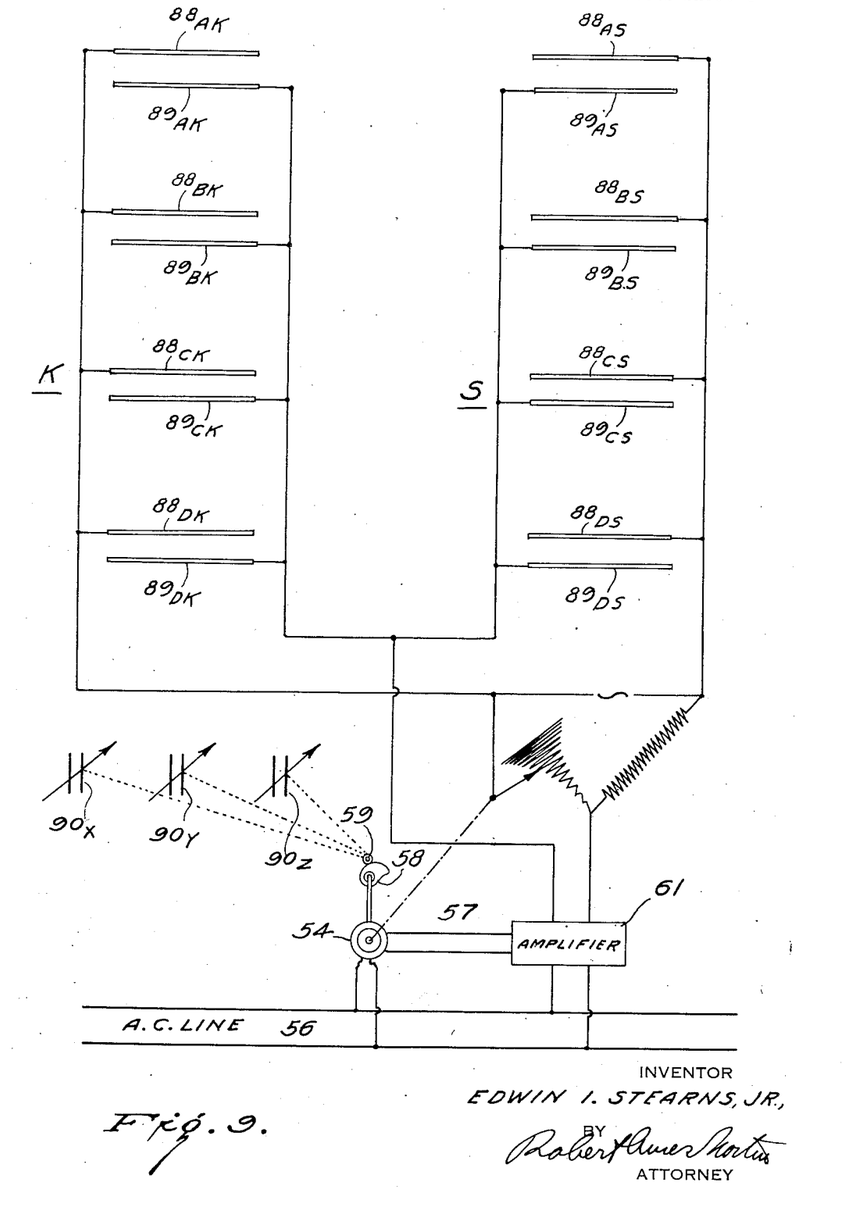
Fig. 9 is a wiring diagram of a modification of Fig. 1 using capacities instead of resistances.

Fig. 9 illustrates a wiring diagram for one pin, in which variable condensers take the place of the rheostats. The condensers on the left hand side which correspond to the K templates are shown schematically as consisting of stationary plates 88AK—88DK and movable plates 89AK—89DK. Similarly, on the right hand side the S condensers are formed of stationary plates 88AS—88DS and movable plates 89AS—89DS. The capacities are connected in parallel, and the shapes of the plates are logarithmic so that each capacity corresponds to K or S and not the logarithm thereof. The sum of the K capacities and the sum of the S capacities form two arms of a Wheatstone bridge exactly as is the case with resistances in Fig. 4. The other elements of the amplifier, bridge, and motor drive bear the same reference numerals as the corresponding parts in Fig. 4 with which they are identical. However, instead of the cam follower driving three potentiometers, it drives the movable plates of three condensers 90x—90z. These condensers have plate surfaces in proportion to the tristimulus coefficients for the particular wave length, and the capacity in each case is therefore equal to the reflectance times tristimulus coefficient for the particular pin position and wave length. Since condenser plates do not have to have uniform shapes, it is possible to use condensers, the plate shape of which effects the transformation from $$\log \frac{K}{S}$$

to R, or this transformation may be divided between condenser plate shape and cam as a result of which the steepness of the cam profile can be reduced still further. The capacities for each pin position, and each tristimulus value are connected in parallel and the total capacity which corresponds to integrated tristimulus values can be indicated or recorded by any conventional means (not shown).

Figure 10:
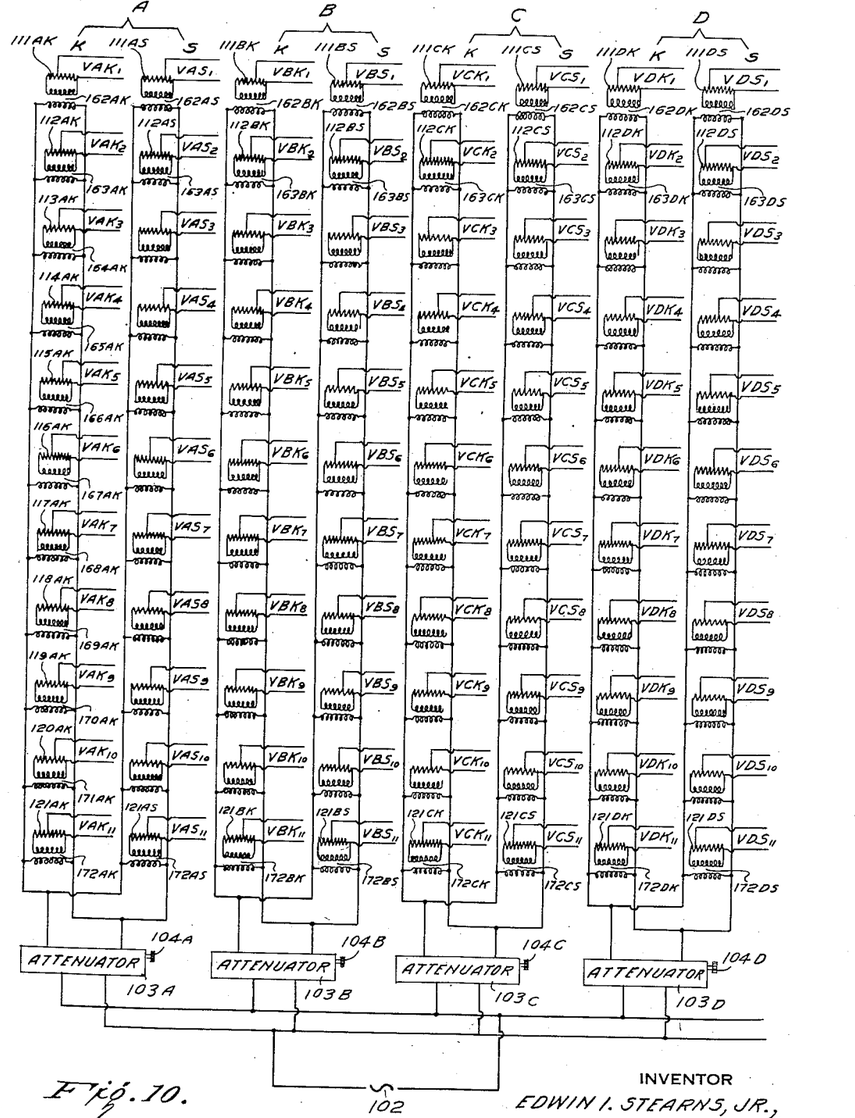
Fig. 10 is a wiring diagram of a modification using tapped resistors to produce voltages.
Figure 11:
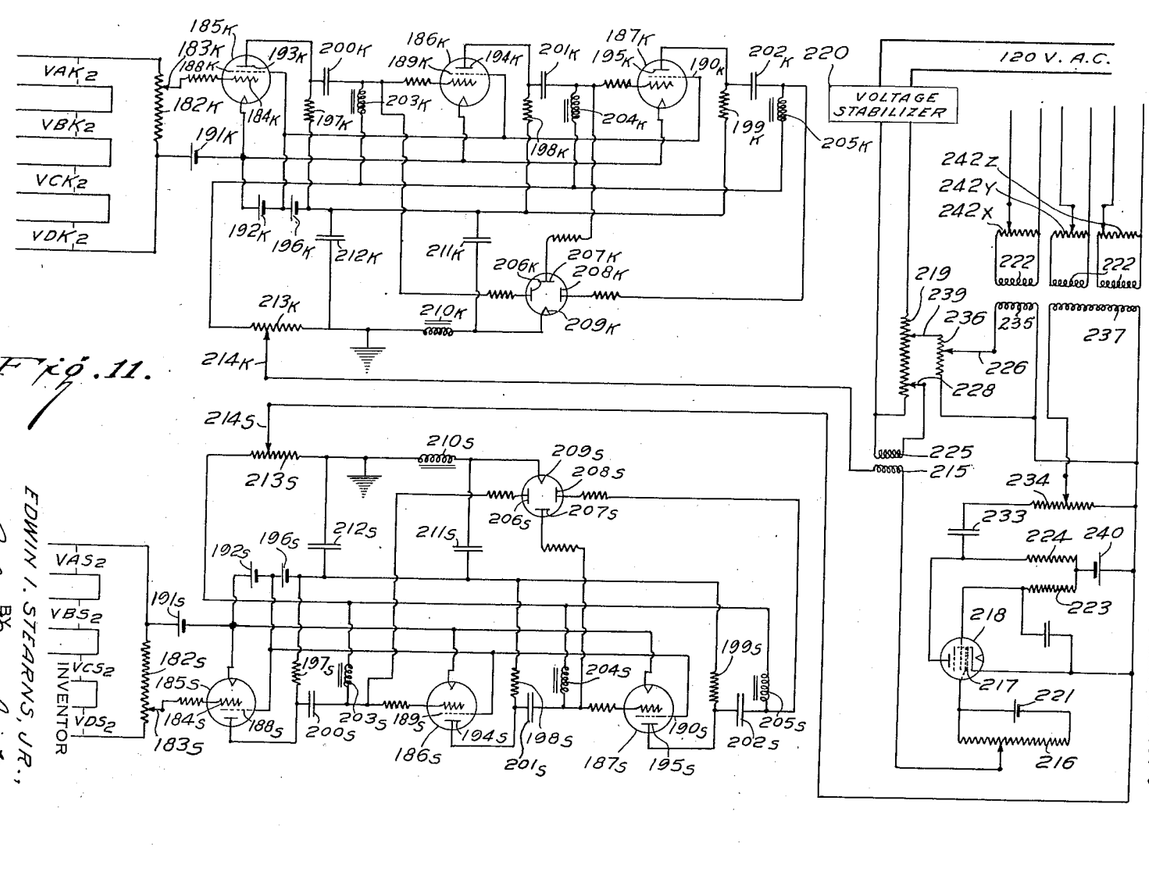
Fig. 11 is a wiring diagram of a double electronic amplifier for transforming the voltages of Fig. 10 into voltages corresponding to tristimulus values.

Figs. 10 and 11 illustrate a different modification in which the products of concentration times K and concentration times S for each selected wave length are produced in the form of voltages which are then transformed by differential electronic amplifiers into voltages corresponding to tristimulus values for each wave length.

A set of tapped resistors 111 to 121, are provided for the eleven wave lengths corresponding to the eleven pin positions of Figs. 1 to 9. The resistance values, however, are proportional to K or S, not to their logarithms. In accordance with the nomenclature used above, these resistors bear the subscript letters for the three pigments and substrate and for K and S respectively. The resistors are connected across the secondaries of transformers 262 to 272, the primaries of which transformers in turn are connected in parallel and the two sets of transformers for each pigment and substrate are fed from a single source of AC voltage 102 through concentration attenuators 103A—103D. The attenuators are actuated by shafts carrying dials 104A—104D. The dials read in concentration of pigment or substrate. Physically, each set of resistors may be mounted on a suitable support and plugged into circuit in conventional manner. The attenuators preferably have output impedances of $1/1{,}000$ to $1/10{,}000$ the resistance of a tapped resistor.

In accordance with the notation used, the voltages produced are designated $V_{AK1}$ to $V_{AK11}$; $V_{AS1}$ to $V_{AS11}$; $V_{BK1}$ to $V_{BK11}$; $V_{BS1}$ to $V_{BS11}$; $V_{CK1}$ to $V_{CK11}$; $V_{CS1}$ to $V_{CS11}$; $V_{DK1}$ to $V_{DK11}$; and $V_{DS1}$ to $V_{DS11}$.

The voltages for a particular wave length corresponding to pins 2AK–DK and 2AS–DS of Figs. 1 to 9 are connected in series (Fig. 11).

In order to avoid confusion by placing reference numerals with subscripts on all of the tapped resistors and noting all of the 88 voltages, only the left hand vertical row corresponding to the K of pigment A and the horizontal rows corresponding to positions 1, 2 and 11 will carry reference numerals and voltage designations.

Fig. 11 shows an amplifier having two logarithmic sections, the differential output thereof feeding a third section which transforms the difference of the logarithms into separate voltages proportional to R times the tristimulus coefficient. In Fig. 11 the amplifier is shown for position No. 2, there being similar amplifiers for the other ten positions. Since the logarithmic sections of the amplifier are identical, their parts will bear the same reference numerals, using the subscript K for the section fed by the sum of the K voltages and the subscript S for the section fed by the sum of the S voltages. In describing the two identical logarithmic sections the parts will be referred to without subscript.

The two voltage sums are impressed respectively across the input resistances 182 of each section, which is of conventional design, and described in the Review of Scientific Instruments, vol. 4, pages 672–675. The amplifier is shown as provided with three tetrodes of the "35" type, 185, 186 and 187, the grid 184 of the first tube receiving a portion of the input signal determined by the setting of the potentiometer arm 183. A bias battery 191 is provided to bring the voltages within the range for which the amplifier is designed. Plate and screen supply voltages are obtained from two batteries 192 and 196. The former supplies the screen grids 188, 189 and 190, and the latter the plates 193, 194 and 195, through plate resistors 197, 198 and 199. Coupling for the tube outputs is through condensers 200, 201 and 202 in series with chokes 203, 204 and 205. A triple plate rectifier tube 209, of the "85" type, provided with plates 206, 207 and 208 receives alternating potential through suitable resistors from the outputs from chokes 203, 204 and 205. The plate and grid of the triode section of the tube are connected together to form the third plate. The cathode of the rectifier is connected to ground through a filter including choke 210 and condensers 211 and 212. A potentiometer 213 through a movable arm 214 connects to a bias battery 221 and potentiometer 216. It is a property of amplifiers of the type described that the output across the potentiometers 213 is proportional to the logarithm of the input voltages. The outputs are proportional to the logarithm of the respective inputs, the constants being so chosen that this output voltage equals 2.66 log input voltage on the grids 184 plus 17.70.

The sliders 214K and 214s produce a voltage on the grid 217 which is proportional to the differential of these two voltages. In other words, it is proportional to $$\log \frac{K}{S}$$

One coil of a transformer 215 is in series with the sliders and grid. The setting is such that this voltage is 0.37 times the differential across the potentiometers 213k and 213s. The voltage is fed to the grid 217 of a "6SJ7" tube 218, a bias of plus 3.72 volts being provided by the battery 221 and potentiometer 216. The screen grid and plate of the tube 218 are supplied through separate resistors 223 and 224 from a battery 240, giving about 300 volts on the plate and 125 volts on the screen. The suppressor grid is connected to the grounded cathode as usual. The plate is coupled to a potentiometer 234 through a condenser 233. From the latter alternating current is applied to the coil 237. This coil is the primary of a transformer provided with three equal secondary coils 222 leading to potentiometers 242 set in accordance with the tristimulus coefficients X, Y and Z for point 2.

A source 220 of stabilized A. C. voltage of suitable magnitude is applied across a double potentiometer 219 one sliding arm of which, 228, impresses a voltage across the other coil 225 of the transformer 215. A second sliding arm 239 connects a potentiometer 236 in series to ground and the sliding arm 226 of this potentiometer impresses a voltage of 0.017 volt across the coil 235 in opposite phase to the voltage in coil 237.

The output voltages representing tristimulus values are connected in series to give three voltages corresponding to integrated tristimulus values which are indicated or recorded by conventional means (not shown).

The process and apparatus described in Figs. 10 and 11 is suitable for operation with values of K or S from 0.1 to 98.1 with an average accuracy of the order of magnitude of 1%. The degree of accuracy suffices for most color matching operations, but where extreme accuracy is necessary, particularly over a very wide range of values of K, it is necessary to use continuous integration, preferably with a more accurate type of input.

Figure 12:
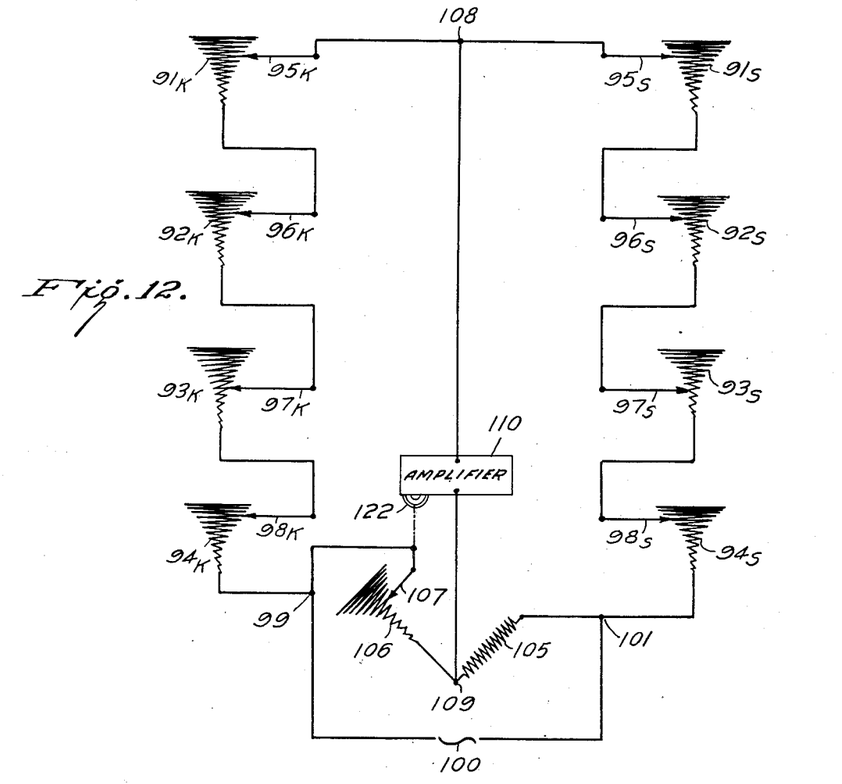
Fig. 12 is a wiring diagram of a modification suitable for continuous integration.
Figure 13:
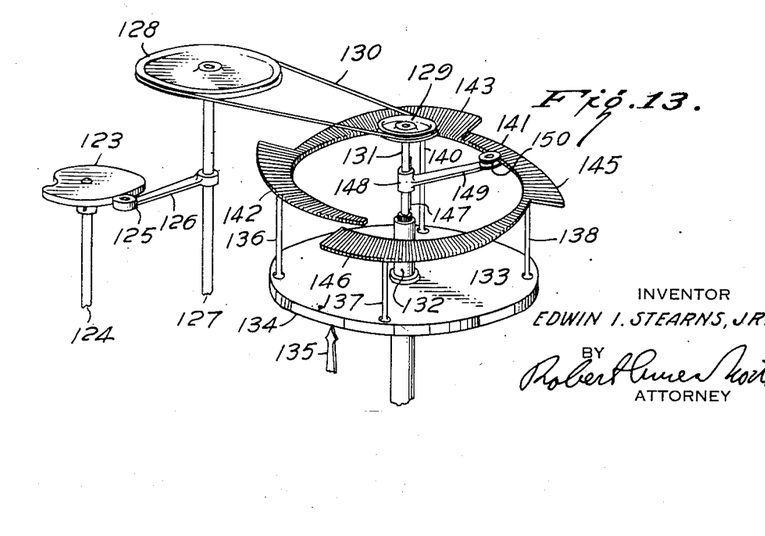
Fig. 13 is a perspective of one of the logarithmic resistances of Fig. 12.

Figs. 12 and 13 illustrate an embodiment of the invention in which resistances are varied in proportion to the product of concentration and K, and concentration and S, respectively, of three pigments and a substrate, the variation being continuous throughout the spectrum. The ratio of the sums of these resistances are then matched to produce a quantity proportional to a function of this ratio. The quantity is then transformed into three quantities proportional respectively to the corresponding reflectance multiplied by the tristimulus coefficients. These three quantities are then continuously integrated throughout the spectrum to produce integrated tristimulus values. Since the present invention is not concerned with the integration step, it is not shown.

Fig. 12 is the wiring diagram in which there are provided pairs of logarithmic resistors for each pigment and substrate. The resistors are numbered 91 to 94 and in accordance with the notation used, the member of each pair which is to correspond to various K's, carries the subscript K, while the corresponding second resistor of the pair carries the subscript S. These resistors, which are of the logarithmic rheostat type, are provided with moving contacts 95 to 98 which are cam driven, as will be described below in connection with Fig. 13. The shape of the cam is such that it produces motion of the movable contact proportional to the logarithm of K or S respectively at each wave length of the spectrum. The four rheostats of each set are connected in series and form two arms of a Wheatstone bridge. Across two of the corners 99 and 101, is impressed a voltage from a source 100 of suitable characteristics such as, for example, D. C. or A. C. of sufficiently low frequency so that the rheostats do not introduce disturbing impedance effects apart from their values as pure resistances.

The other two arms of the Wheatstone bridge consist of a unit resistor 105 and a logarithmic rheostat 106, provided with a movable contact 107. An electronic amplifier 110 is connected across the other two corners 108 and 109 of the Wheatstone bridge. The output of the amplifier 110 actuates the motor 122, which drives the movable arm 107 in a direction to restore the bridge to balance, at which point the input to the amplifier disappears and the motor stops. The amplifier 110 and motor 122 are, of course, connected to a suitable source of alternating current in the usual manner, as is illustrated in connection with the corresponding amplifier of Fig. 4. For sake of clearness, the alternating current connection is omitted from Fig. 12, as it is purely conventional.

The motion of the motor 122 is proportional to a function of the ratio of the sum of resistances 91K to 94K, divided by the sum of resistances 91s to 94s. In the figure, this function is the logarithm of the ratio, because the rheostat 106 is logarithmic. The movement of the motor 122 can be used to create physical quantities such as displacements, voltages, etc., proportional to the reflectance corresponding to the ratio of the two sets of rheostats 91K to 94K and 91s to 94s. This may be effected by a suitable cam, as is shown in Fig. 4. The displacement of cam followers are physical quantities which may be multiplied by the three tristimulus functions and integrated throughout the spectrum with respect to wave length. The displacements may be used as such, or transformed into other physical quantities such as voltages, which latter is illustrated in Fig. 4.

Fig. 13 shows, schematically, a physical form of one of the rheostats 91. A cam 123 on a shaft 124 is rotated, the cam profile being such that the displacement of its cam follower 125 is proportional to the logarithm of K. The cam follower 125 forms the end of an arm 126, clamped to a shaft 127, on which there is mounted a pulley 128. This pulley drives a second, and preferably smaller pulley 129 through a cable 130. The pulley 129 is keyed to a shaft 131 which in turn is journalled in a hollow shaft 132, on which is mounted a disc 133, provided on its outer edge with a scale 134, capable of movement past a pointer 135. The scale 134 is preferably logarithmic. On the disc 133 are mounted four posts 136, 137, 138 and 140. The posts are of different heights and support a logarithmic resistance 141, consisting of four decades 142, 143, 145 and 146. Because of the non-uniform height of the posts 136—140, the resistance is in the form of a spiral.

On the shaft 131 there is a spline 147 registering in a key way, in one end 148 of an arm 149, carrying a movable contact 150. The end 148 is axially movable on the shaft 131, but rotates therewith by reason of the key 147.

Motion of the cam 123 results in a proportional displacement of the contact 150. In other words, this contact moves in proportion to the logarithm of K for each particular wave length of the spectrum, and the disc 133 is also capable of movement, and can be adjusted manually in accordance with the logarithm of concentration of the pigment or substrate to which the rheostat corresponds. The logarithmic scale 134 thus permits the pointer 135 to read concentration directly.

Since the displacements of the contact 150 and the resistance 141, which moves with the disc 133, are respectively proportional to the logarithms of K and concentration, and relative displacement of the contact 150 with respect to the resistance 141, is proportional to the logarithm of the product of concentration by K at each wave length in the spectrum in turn. Since the winding of the resistance 141 is logarithmic, the value of resistance is proportional to the product of concentration and K, and not to the logarithm thereof. In a similar manner, the rheostats for K and S for the other pigments and substrate are provided with cams, the profiles of which correspond to the logarithm of K or S, as the case may be, of the particular cam or substrate. Fig. 13 is diagrammatic in nature, to show clearly the relation of the various elements. In practice, anti-logarithmic rheostats of known design are used. The details of the construction and mounting are, of course, no part of the present invention.

Figs. 12 and 13 illustrate an extremely simple design, by means of which physical quantities are produced at each wave length of the spectrum proportional to the reflectance corresponding to the ratio of the sum of CK's and CS's of the pigments and substrate. With many pigments and substrates, this simple and rugged modification may be used with adequate accuracy, and where the nature of the curves of K of pigments and substrates permit, this simple modification presents material constructional advantages. There are, however, pigments which have K's that change in such a manner that it is not possible to obtain sufficient accuracy in a cam profile with cams of practical size. In order to solve the problem presented by such pigments, a more complex but also more accurate modification is needed. Such a form of the invention is shown diagrammatically in Figs. 14 and 15. Because of the feasibility of extreme accuracy in voltage generating circuits, voltages are generated proportional to K multiplied by concentration for each of the pigments. The voltages for CK are summed, matched, and a resistance proportional to the sums produced by the matching device. Resistances are also produced proportional to the light scattering function multiplied by concentration of the pigments as is described in Fig. 12. These resistances, connected in series, form with the resistance proportional to the sum of the voltages for CK two arms of a Wheatstone bridge in a manner similar to Fig. 12. The bridge is balanced producing a physical quantity proportional to the reflectance corresponding to the ratio of CK and CS. The operation will be described qualitatively in connection with Fig. 14, the details of the electrical voltage circuits being shown in Fig. 15.

Figure 14:
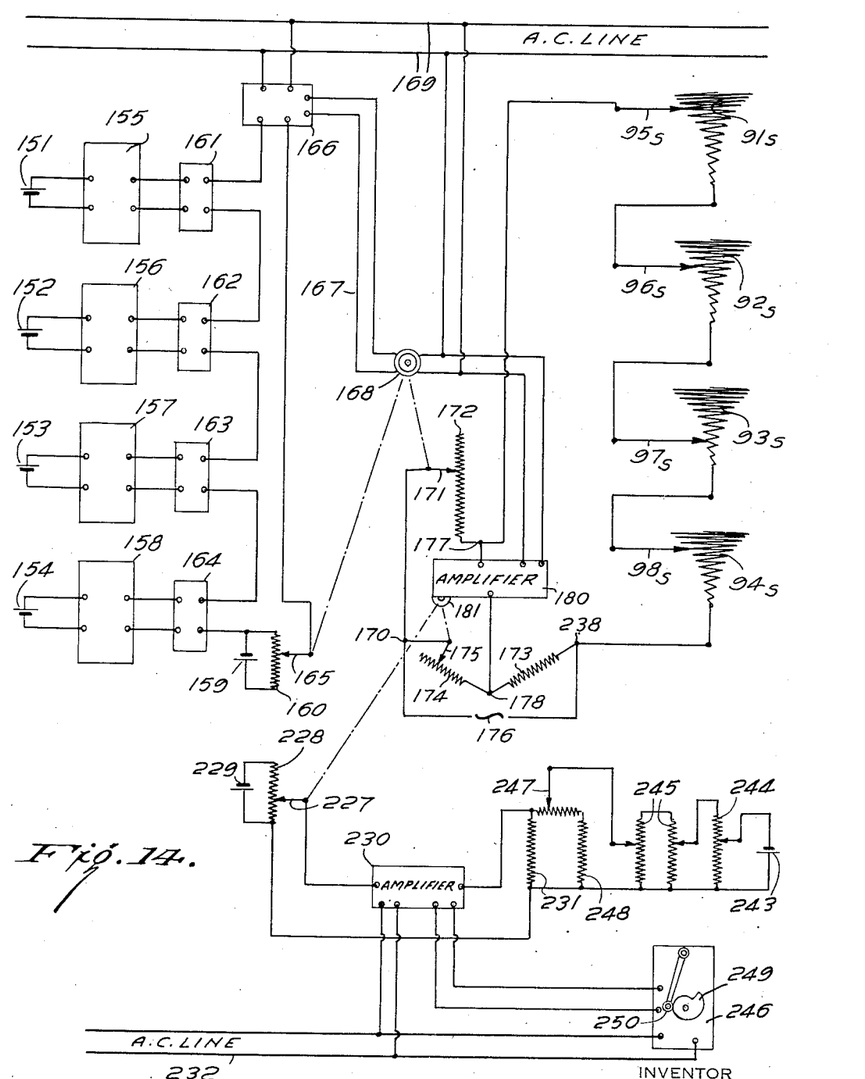
Fig. 14 is a schematic of a high precision modification for pigments having a wide range of K's.
Figure 15:
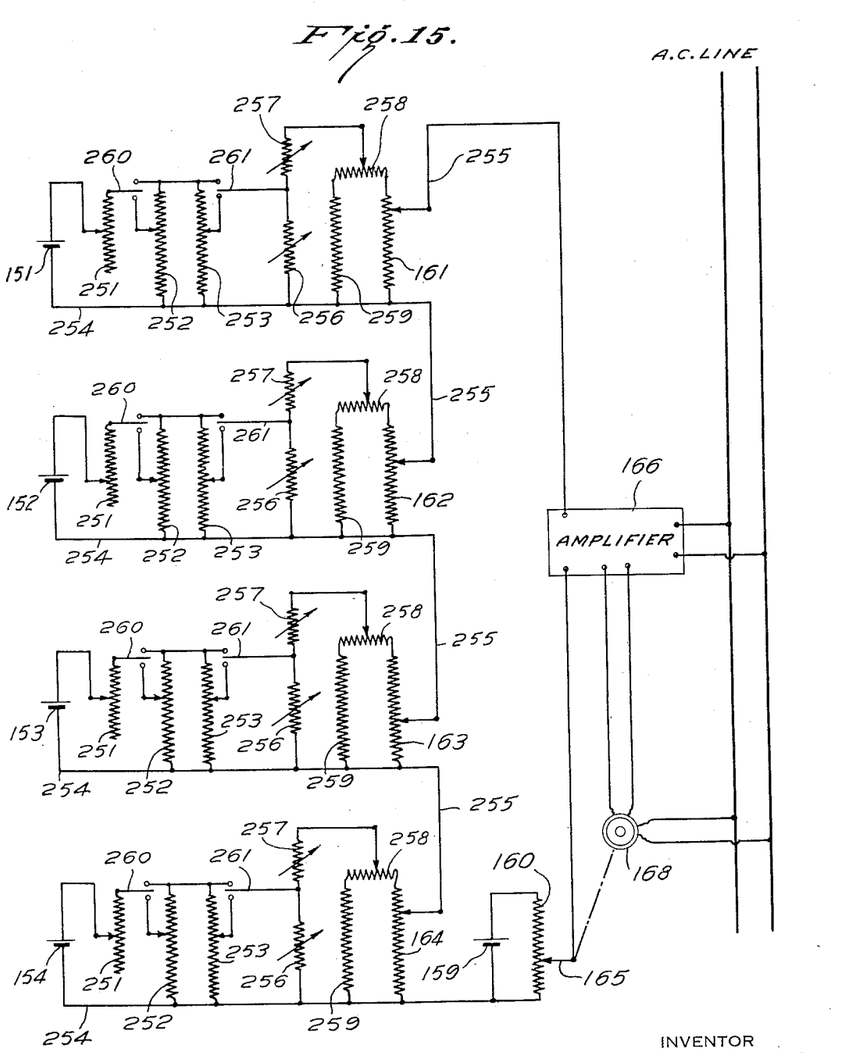
Fig. 15 is a detailed wiring diagram of one-half of the circuits shown in Fig. 14.

There are provided for each pigment and substrate a voltage generator and a resistance. The resistances are proportional to CS for each pigment and as they are identical in design and form with those in Fig. 12 they bear the same reference numerals 91s to 94s. The voltage generators include batteries 151 to 154 which feed attenuators 155 to 158. The electrical characteristics of these attenuators will be described below, and are such that they produce an attenuated voltage proportional to the K of a given pigment or substrate. These voltages are then passed through concentration attenuators 161 to 164. The concentration attenuators, the electrical circuits of which will be described in connection with Fig. 15, are operated manually, and produce output voltages which are proportional to K and concentration of the pigments or substrates. The voltages are connected in series with a battery 159 and potentiometer. The connection is such that the voltage produced is in opposition to the sum of the attenuated voltage. The moving arm 165 of the potentiometer 160 is connected to amplifier 166 so that the input of the amplifier is the differential between the sum of the attenuated CK voltage and the voltage of potentiometer 160. The amplified output of the amplifier 166 leads through wire 167 to balancing motor 168. The amplifier is fed with alternating current from an alternating current line 170, the motor likewise being fed from the same line through wires 169. The matching or balancing motor 168 moves the contact 165 of the matching potentiometer 160 in a direction to bring about balance, at which point there is no input to the amplifier and the motor stops turning.

The motor 168 also moves contact 171 over the resistance of rheostat 172. The connection is such that the resistance in each case is proportional to the voltage in the matching potentiometer 160. The rheostat 172 and resistances 91s to 94s form arms of a Wheatstone bridge, the other two arms being formed of a unit resistance 173 and a matching or balancing rheostat 174, provided with a movable contact 175. A source of suitable voltage 176 is impressed across two corners 170 and 238 of the bridge. The other two corners 177 and 178 are connected to an amplifier 180 which receives alternating current input from the A. C. line, through wires 169 and 179. The output of the amplifier drives a matching or balancing motor 181 which moves both the movable contact 175 and a movable contact 227 of a potentiometer 228, which is provided with a battery 229. The output voltage of this potentiometer is in series with the output resistance 231 of an output attenuator, and with a matching amplifier 230 which is fed from an A. C. line 232.

The output attenuator referred to above consists of a battery 243 leading to a rheostat 244, and to potentiometers 245. The moving contacts on the rheostat and the potentiometers are ganged together and moved by a motor driven matching device 246, the motor of the latter being driven by the output of the amplifier 230 and receiving alternating current from the line 232. The moving contact of the last potentiometer 245 is connected through an adjustable contact 247 to an output impedance formed of the resistance 231 and a second resistance 248. The motor of the device 246 is so phased as to turn in a direction to balance the voltage across the resistance 231. At balance the input to the amplifier 230 vanishes and the motor ceases to turn.

The balancing motor drives a cam 249 provided with a cam follower 250. The profile of the cam 249 is so chosen that the movement of the cam follower 250 is proportional to the reflectance corresponding to a quantity $b$ found in the formula:

$$\frac{K}{S} = \frac{(1-b)^2}{b}$$

the movement of the movable arms of the rheostat 244 and potentiometers 245 being proportional to $b$. In other words, the movement of the cam follower 250 is a physical quantity proportional to the reflectance corresponding to the ratio of the sum of the CK's of the pigments, divided by the sums of the CS's. This physical quantity may then be multiplied by the tristimulus functions and integrated continuously throughout the spectrum with respect to wavelength to produce integrated tristimulus values.

Fig. 15 shows the electric circuit of one set of four attenuated voltage generators in Fig. 14, the same parts bearing the same reference numerals. The electrical circuits are very similar to that of the output attenuator described in Fig. 14, except that in place of a fixed output resistance 231, there is provided an output potentiometer. The circuits for all four attenuators consisting of the same elements, these elements will bear the same reference numerals, except that batteries and concentration attenuators carry separate numerals as in Fig. 14.

The attenuators are provided with three resistances; one, 251, being connected in series with the batteries 151 to 154, and the other two, 252 and 253, being connected as potentiometers. The movable contacts of the resistances are ganged together and moved in proportion to $b$ for the different pigments and substrate. This may be effected by any suitable means, such as cams as described in connection with Fig. 13. The positive terminals of the batteries are connected to common wires 254 of the potentiometer resistances which lead to one end of the concentration attenuators 161 to 164. These latter attenuators may be in the form of decade potentiometers with movable arms 255. Manually adjustable resistances 256 and 257 connect to the variable contact of a resistance 258 which joins the potentiometer resistance to a second resistance 259. The purpose of these elements is to allow for adjustment to battery voltage changes without disturbing the balance of the rest of the circuit.

For certain pigments and substrates, the degree of accuracy which is obtainable with the complete network is not necessary, and a simpler circuit can be used. This is effected by two single pole, double throw switches. These switches, in one position, can connect an end of the series resistances 251 and 258 to the corresponding end of the decade potentiometers. Since the resistances 252 and 253 remain on the line, the balance of the circuit is not changed. This simplified circuit corresponds essentially to a rheostat in series with the potentiometer and is useful with pigments having certain ranges of K.

The connections of the concentration attenuators 161 to 164 to the amplifier 166 and matching potentiometer 160 are the same as in Fig. 14, and the operation is as there described.

The process and apparatus of the present invention has been described in connection with pigments only because the invention relates to the solution of the problem which is presented by pigments. Dyes can be handled by the methods and apparatus described in connection with the Stearns and Park applications referred to above. It is of course possible to combine pigments with dyes. A dye behaves essentially the same as a pigment which has a light scattering function equal to zero. In other words, if it were desired to obtain the reflectance of two pigments and a dye, the portion of the process and apparatus dealing with the production of a physical quantity proportional to CS would be eliminated. This may be readily understood in connection with Figs. 4 and 12, which represent the simplest embodiments of the present invention. Let us suppose that the color C is a dye and not a pigment. This would be handled simply by shortcircuiting the resistance 22 CS in Fig. 4 or 93S in Fig. 12. Shortcircuiting the resistance is the same thing as dealing with a pigment, the light scattering function of which is equal to zero. In the case of the modification of Fig. 10 the amplified resistors corresponding to CS are not plugged in and the corresponding outputs shorted in Fig. 11.

I claim:

1. An apparatus for producing a physical quantity corresponding to the reflectance of a plurality of colors comprising a plurality of pigments, which comprises in combination means for generating at a plurality of wavelengths in the visible spectrum physical quantities proportional to concentration of the pigments, and physical quantities proportional respectively to the additive light absorption function of each pigment and the additive light scattering function of the same pigment, means for combining the quantities proportional to concentration and additive light absorption function and concentration and additive light scattering function respectively to produce additive physical quantities proportional respectively to the product of concentration by additive light absorption function and concentration by additive light scattering function for each pigment, means for summing the two sets of additive physical quantities for the pigments at each wave length, means for obtaining a ratio of the sums of the two sets, and means for transforming the ratio of said sums into a physical quantity corresponding to reflectance.

2. An apparatus for producing a physical quantity corresponding to the reflectance of a plurality of colors comprising a plurality of pigments, which comprises in combination means for generating at a plurality of wavelengths in the visible spectrum physical quantities proportional to concentration of the pigments, and physical quantities proportional respectively to the additive light absorption function of each pigment and the additive light scattering function of the same pigment, means for combining the quantities proportional to concentration and additive light absorption function and concentration and additive light scattering function respectively to produce resistances proportional to the product of concentration by additive light absorption function and concentration by additive light scattering function respectively for the same pigment, the resistances proportional to the product of concentration by additive light absorption function for the pigments at each wavelength being connected in series to form a set, and the resistances proportional to the product of concentration by additive light scattering function being likewise connected in series to form a set, the two sets of resistances simultaneously forming two arms of a Wheatstone bridge, a unit resistance and motor-driven variable resistance connected as the other two arms of said bridge, a source of electromotive force connected across opposite corners of said bridge, an electronic amplifier connected across the other two corners, the output of the amplifier being connected to the motor of the motor-driven variable resistance in phase to rotate in a direction to restore the bridge to balance, and means for transforming the displacement of the variable element of said variable resistance into a physical quantity proportional to reflectance corresponding to the ratio of the two sets of summed resistances.

3. An apparatus for producing a physical quantity corresponding to the reflectance of a plurality of colors comprising a plurality of pigments, which comprises in combination means for generating at a plurality of wavelengths in the visible spectrum physical quantities proportional to concentration of the pigments, and physical quantities proportional respectively to the additive light absorption function of each pigment and the additive light scattering function of the same pigment, means for combining the quantities proportional to concentration and additive light absorption function and concentration and additive light scattering function respectively to produce capacities proportional to the product of concentration by additive light absorption function and concentration by additive light scattering function respectively for the same pigment, the capacities proportional to the product of concentration by additive light absorption function for the pigments at each wavelength being connected in parallel to form a set, and the capacities proportional to the product of concentration by additive light scattering function being likewise connected in parallel to form a set, the two sets of capacities simultaneously forming two arms of a Wheatstone bridge, a unit resistance and motor-driven variable resistance connected as the other two arms of said bridge, a source of alternating electromotive force connected across opposite corners of said bridge, an electronic amplifier connected across the other two corners, the output of the amplifier being connected to the motor of the motor-driven variable resistance in phase to rotate in a direction to restore the bridge to balance, and means for transforming the displacement of the variable element of said variable resistance into a physical quantity proportional to reflectance corresponding to the ratio of the two sets of summed capacities.

4. An apparatus according to claim 1 in which the additive physical quantities proportional to the product of concentration by additive light absorption function and concentration by additive light scattering function, are voltages.

5. An apparatus according to claim 4 comprising means for transforming the physical quantity corresponding to reflectance into three additive physical quantities corresponding to the product of reflectance by each of the tristimulus coefficients respectively for each wavelength, and means for summing for all wavelengths physical quantities corresponding to each tristimulus coefficient.

6. An apparatus according to claim 2 comprising means for transforming the physical quantity corresponding to reflectance into three additive physical quantities corresponding to the product of reflectance by each of the tristimulus coefficients respectively for each wavelength, and means for summing for all wavelengths physical quantities corresponding to each tristimulus coefficient.

7. An apparatus according to claim 3 comprising means for transforming the physical quantity corresponding to reflectance into three additive physical quantities corresponding to the product of reflectance by each of the tristimulus coefficients respectively for each wavelength, and means for summing for all wavelengths physical quantities corresponding to each tristimulus coefficient.

8. An apparatus for producing voltages voltages proportional to the integrated tristimulus values of a plurality of pigments which comprises means for producing voltages corresponding to concentration of each pigment, means for transforming said concentration voltages into a set of voltages proportional to the product of concentration by additive light absorption function for each pigment at fixed wavelengths in the visible spectrum, means for transforming the concentration voltages into a second set of voltages proportional to the product of concentration by additive light scattering function for each pigment at the same fixed wavelengths in the visible spectrum, means for connecting in series the voltages proportional to the product of concentration by additive light absorption function for each pigment at each wavelength, means for connecting the voltages proportional to the product of concentration by additive light scattering function for each pigment at each wavelength, a pair of electronic amplifiers for each wavelength capable of producing output voltages proportional to the logarithm of input voltage, means for connecting the series voltages for each wavelength respectively to the inputs of the electronic amplifiers, a third electronic amplifier for each wavelength receiving its input from the differential of the output of the pair of logarithmic amplifiers, said amplifier producing an output voltage proportional to reflectance, and means for transforming said output voltage into three voltages proportional to the product of said output voltage by each of the three tristimulus coefficients for the wavelengths.

EDWIN I. STEARNS, Jr.

REFERENCES CITED

The following references are of record in the file of this patent:

UNITED STATES PATENTS

| Number | Name | Date |
| --- | --- | --- |
| 2,008,410 | Wilson | July 16, 1935 |
| 2,114,867 | Wilson | Apr. 19, 1938 |
| 2,244,826 | Cox | June 10, 1941 |
| 2,443,098 | Dean | June 8, 1948 |